(12) United States Patent
Reiter et al.

(10) Patent No.: US 7,214,909 B2
(45) Date of Patent: May 8, 2007

(54) TEMPERATURE SENSOR

(75) Inventors: Werner Reiter, Wien (AT); Christian Marx, Zwentendorf (AT)

(73) Assignee: Electrovac, Fabrikation elektrotechnischer Spezialartikel Ges.m.b.H., Klosterneuburg (AT)

( * ) Notice: Subject to any disclaimer, the term of this patent is extended or adjusted under 35 U.S.C. 154(b) by 0 days.

(21) Appl. No.: 11/065,435

(22) Filed: Feb. 24, 2005

(65) Prior Publication Data

US 2005/0184044 A1    Aug. 25, 2005

(30) Foreign Application Priority Data

Feb. 24, 2004   (EP) ................... 04004153

(51) Int. Cl.
*H05B 3/68* (2006.01)

(52) U.S. Cl. ............... 219/448.11; 219/460.1

(58) Field of Classification Search ........... 219/446.1, 219/448.11, 448.12, 448.14, 448.16, 460.1, 219/541, 542, 543, 544; 338/22 R, 304, 338/308, 309, 322, 323, 328; 374/185

See application file for complete search history.

(56) References Cited

U.S. PATENT DOCUMENTS

| 1,697,954 | A | * | 1/1929 | Gribbie ................ 439/883 |
| 3,892,947 | A | * | 7/1975 | Strengholt ............. 219/522 |
| 4,371,861 | A |   | 2/1983 | Abdelrahman et al. |
| 4,815,198 | A | * | 3/1989 | Ramus .................... 29/611 |
| 5,288,973 | A | * | 2/1994 | Ota et al. ................ 219/216 |
| 5,430,428 | A | * | 7/1995 | Gerblinger et al. ......... 338/25 |
| 6,155,711 | A |   | 12/2000 | Schaupert et al. |
| 6,653,926 | B1 | * | 11/2003 | Zitzmann ................ 338/25 |
| 6,940,048 | B2 | * | 9/2005 | Wilkins ............... 219/448.13 |
| 2002/0071475 | A1 | * | 6/2002 | Betzner et al. ........... 374/185 |
| 2003/0072352 | A1 | * | 4/2003 | Muziol ................... 374/208 |

FOREIGN PATENT DOCUMENTS

| DE | 31 00 852 A1 | 8/1982 |
| DE | 199 25 367 A | 1/2000 |
| EP | 0 063 264 | 10/1982 |
| EP | 0 437 356 A | 7/1991 |
| EP | 0 806 886 A | 11/1997 |
| EP | 0 823 620 A | 2/1998 |
| GB | 2 095 834 A | 10/1982 |
| GB | 2 103 910 A | 2/1983 |
| WO | WO 03/007660 AA | 1/2003 |

* cited by examiner

*Primary Examiner*—Sang Y. Paik
(74) *Attorney, Agent, or Firm*—Henry M. Feiereisen

(57) ABSTRACT

A sensor positioned between a heat source and a heating area in parallel relationship to the heating area, for determining a mean value of the temperature of the heating area, includes a ceramic element, and a temperature-dependent resistor web attached to the ceramic element and confronting the heating area at a distance thereto. The resistor web has a length of at least 200 mm, and is electrically contacted at a contact point outside a region in which the temperature is to be ascertained.

8 Claims, 4 Drawing Sheets

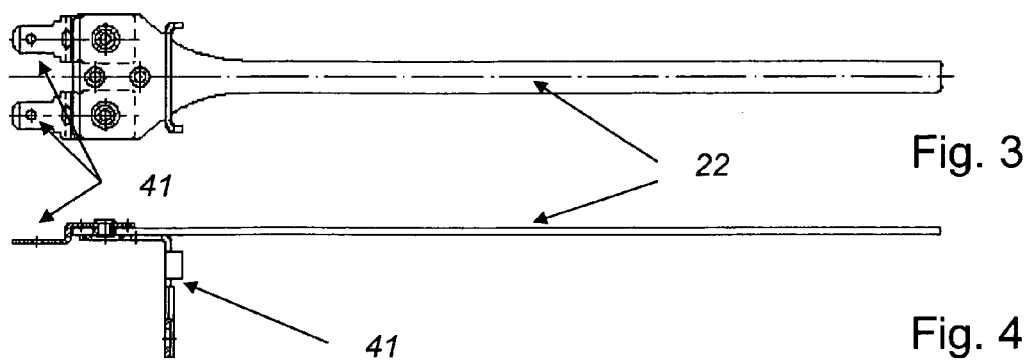
Fig. 3
Fig. 4
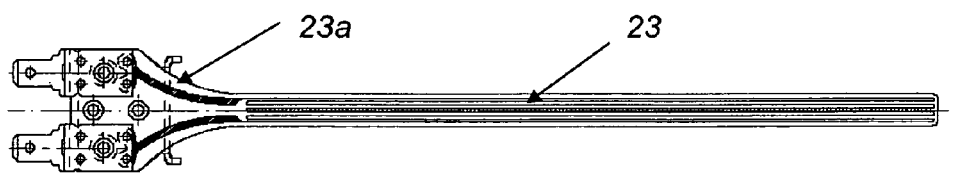
Fig. 5
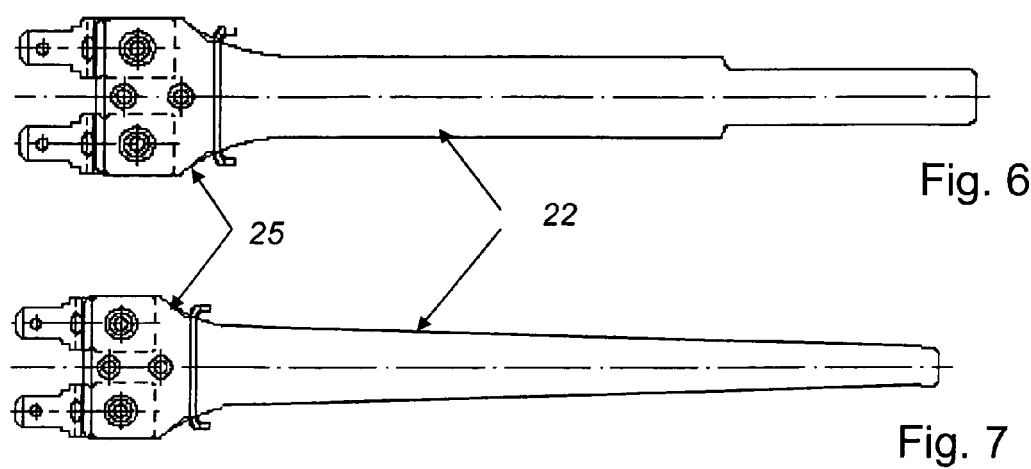
Fig. 6
Fig. 7

TEMPERATURE SENSOR

CROSS-REFERENCES TO RELATED APPLICATIONS

This application claims the priority of European Patent Application, Ser. No. 04004153.5, filed Feb. 24, 2004, pursuant to 35 U.S.C. 119(a)–(d).

BACKGROUND OF THE INVENTION

The present invention relates to a sensor for determining the mean value of the temperature of a heating area heated by a heat source, such as a glass ceramic hot plate, which is positioned between the heat source and the heating area and parallel thereto, the sensor comprising a ceramic element and a temperature-dependent resistor web attached to the ceramic body and the resistor web being positioned facing toward the heating area and at a distance thereto.

In typical electric stoves, particularly having a ceramic cooktop, one electromechanical protective temperature limiter is provided per heater to limit it to the maximum temperature. If the cooking platform is controlled using an electronic system, a substitution of the mechanical temperature limiter by electronic temperature sensors is possible, since the necessary circuit breaker (relay) is already provided. In the electronic control units used, a sensor is frequently also positioned in the region of the electronics of an electric stove.

For the operational reliability of the cooktop, it is important that these sensors are calibrated and thus detect the temperature of the particular cooktop reliably. However, the calibration of sensors requires a significant outlay and therefore causes significant costs. For example, resistance sensors must be trimmed into some sort of shape, this trimming not only causing additional costs, but rather also impairing the quality of the sensor and partially determining the size of the sensor.

A specific application of the present invention is the design and manufacturing of a resistance sensor, no further calibration steps having to be performed before it is installed in the cooktop. Resistors which are used for temperature measurement because of their defined temperature-dependent electrical conductivity characteristics are well-known. DE 3100852 reports on the use of temperature-dependent thin-film and/or thick-film resistors, positioned in the shape of a Greek key, for heating and/or temperature measurement purposes. In a special embodiment, the application of thin platinum or nickel webs to $Al_2O_3$ is suggested here. Further publications to be considered as prior art in this regard are, for example, U.S. Pat. No. 4,371,861 and EP 0063264. According to the present application, bringing sensors of this type as close as possible to parts which are heated directly or indirectly and whose temperature it is necessary to know is obvious. On the basis of these embodiments, WO 03/007660 describes a construction of a glass ceramic cooktop whose temperature is detected using a platinum resistance sensor of this type. Specifically, this invention claims a platinum resistor web for temperature detection, printed on a flat ceramic, which is positioned coplanarly to the heated glass ceramic area and in direct proximity thereto. However, it cannot be conclusively inferred from the embodiment specified therein how the temperature detection criteria required for cooktops per se are technically achieved using the platinum resistance sensor specified.

It would therefore be desirable and advantageous to provide an improved temperature sensor which obviates prior art shortcomings and is constructed compact enough to enhance a design freedom of a cooktop, while ensuring maximum operational reliability of the ceramic cooktop.

SUMMARY OF THE INVENTION

According to one aspect of the present invention, a sensor positioned between a heat source and a heating area in parallel relationship to the heating area, such as a glass ceramic hot plate, heated by a heat source for determining a mean value of the temperature of the heating area, said sensor including a ceramic element, and a temperature-dependent resistor web attached to the ceramic element and confronting the heating area at a distance thereto, wherein the resistor web has a length of at least 200 mm and is electrically contacted at a contact point outside a region in which the temperature is to be ascertained.

According to another feature of the present invention, the resistor web may be implemented in the region between the contact point and the temperature-sensitive region of the sensor with a larger, particularly at least doubled cross-section in comparison to that in the measurement region. The electrical resistance per length of the resistor web is thus significantly reduced in this region and the influence on the temperature measurement in this region is thus kept low.

Furthermore, the ceramic element may taper toward the free end, facing away from the contact, to improve the mechanical stability. Thus, with sufficient mechanical stability, the ceramic element may be kept as light and material-saving as possible, the shadowing of the heating coil by the ceramic element able to be kept to a minimum at the end facing away from the contact in particular.

In particular, the ceramic element may have a broadened region in the region of the contact, the transition to the remaining narrower region of the ceramic element preferably being rounded concavely.

According to another feature of the present invention, contact parts made of elastically springy material may be provided for contacting the resistor layer, which are provided with indentations facing toward the resistor web and are riveted to the ceramic element. A contact which is lasting even in the event of frequent alternating temperature stresses may thus be manufactured.

Furthermore, a flat web material may be used for the contact of the resistor web, the flat web material being positioned at least partially between the ceramic element and the resistor web and being connected to the resistor web, the surface of the sensor representing a flat area. The mean value of the temperature in the heating region may thus be detected especially reliably.

According to another feature of the present invention, the resistor web of the sensor may be insulated using a closed passivation layer. The resistor web is thus reliably protected from chemical influences and keeps its thermoelectric properties longer, so that temporal drift of the measurement region is minimized.

According to another aspect of the present invention, a method for calibrating a temperature sensor in a heating region of a ceramic cooktop having a computer unit which is connected to the sensor via electrical lines, includes the steps of providing a calibrated standard sensor in an area of the computer unit, equalizing the sensor with the standard sensor in the temperature equilibrium, and storing a corresponding calibration value in a memory unit of the computer unit.

In accordance with the present invention, uncalibrated sensors may be calibrated automatically and cost-effectively in the installed state, while ensuring maximum operational reliability of the ceramic cooktop.

In particular, the sensors may be implemented as resistance sensors, each having a resistance R(T) as a function of the temperature T, particularly platinum resistance sensors, each having known electrical resistance coefficients and the initially unknown null resistance $R_0$ at a standard temperature $T_0$, particularly room temperature, e.g. 25° C., as the calibration value, R(T) at the temperature $T_0$ being determined by the computer unit, and $R_0$ being determined according to the formula $R_0=(1+\alpha-\Delta T)/R(T)$, $\Delta T=T-T_0$, and the value for $R_0$ being stored in the memory unit as a calibration value. The calculation method for determining $R_0$ is distinguished by special simplicity and may be implemented even by a simple and cost-effective computer unit.

According to another feature of the present invention, the method may be triggered again, manually or automatically after a predefined period of time, and the calibration values in the memory unit may be updated. A temporal drift of the sensor may thus be reliably equalized and the precision of the sensor may be ensured even over a long period of time.

According to another feature of the present invention, the temperatures of the heating regions may be stored in the memory unit at predefined time intervals. Temperature-time curves are thus also detectable.

According to another feature of the present invention, further sensors may be provided in regions outside the heating regions, for example, on the back wall or side walls of a ceramic cooktop or the like, which are calibrated in the same way as the sensors. It may thus be detected whether temperatures which would be of concern for neighboring furniture, for example, are exceeded.

According to another aspect of the present invention, a method for calculating a temperature at arbitrary points in a ceramic cooktop having a heating region and a sensor in the heating region, includes the step of using a computer unit to determine a current temperature at an arbitrary region of the ceramic cooktop outside the heating region from current temperatures at the sensor and families of characteristics for temperature curves which are stored in a memory unit of the computer unit.

For optimum operational reliability of a ceramic cooktop, it is advantageous to know the current temperature at as many points of the ceramic cooktop as possible. However, a large number of sensors is connected with high costs and their installation is connected with restriction of the design freedom. Thus, the design freedom of the ceramic cooktop is enhanced, and maximum operational reliability is ensured in a cost-saving way, even using a low number of sensors. Thus, even in regions which no sensors are positioned in direct proximity to, the temperature may be determined and higher operational reliability may be achieved with a comparatively low number of sensors and therefore relatively low costs.

According to another feature of the present invention, the computer unit may trigger an alarm, a switching procedure, or a regulating procedure upon reaching a predefined temperature limiting value $T_{max}$, which is predefined for both heating regions and any arbitrary region outside the heating regions. The usefulness of the sensors and the operational reliability of the ceramic cooktop is thus elevated further.

It is therefore conclusively shown and also the goal that by applying this method, maximum operational reliability may be ensured in a cost-saving way using a low number of sensors.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 3 to 7 show different embodiments of a sensor,

DETAILED DESCRIPTION OF PREFERRED EMBODIMENTS

Figure 1:
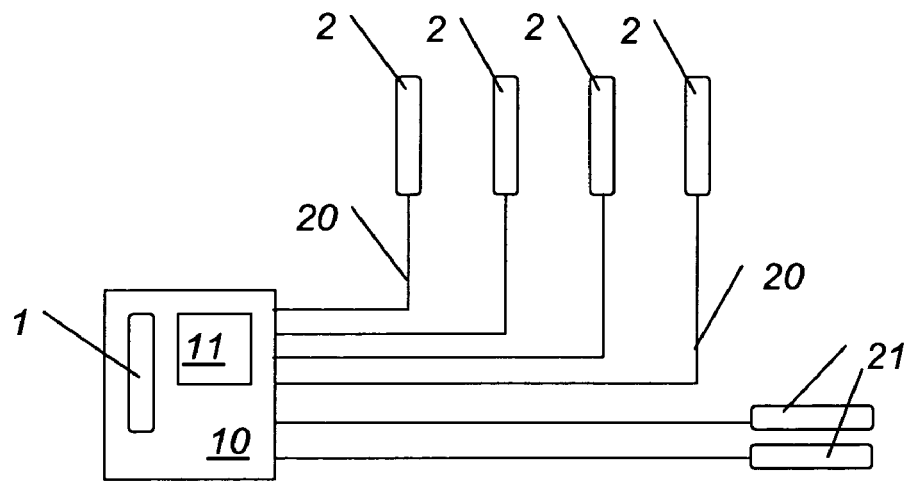
FIG. 1 shows a schematic arrangement of computer unit and sensors.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Resistance sensors are usable very cost-effectively. Platinum resistance sensors in particular are distinguished by a low temporal drift. The calculation method for determining $R_0$ is distinguished by special simplicity and may be executed by a simple and therefore cost-effective computer unit.

In a further embodiment of the present invention, it is advantageous, also in consideration of compact construction of the entire cooktop 33, to design the sensor(s) 2 in the region of the cooktop 33 according to the temperature-dependent resistance principle. In regard to the type of construction, these are platinum thick-film resistor webs printed on ceramic, preferably on $Al_2O_3$, which are positioned in such a way that the two necessary electrical contacts are positioned on the same side of the ceramic substrate.

Instead of platinum, other metals, transition metals and their alloys which are sufficiently resistant to thermal oxidation may also be used in the form of a thick-film resistor web for the sensor purposes claimed here.

Without being fixed on a theory, empirical experiments have shown that the length of the printed platinum resistor web 23 is significantly dependent on its length for practical temperature measurement precision in glass ceramic cooktop 33, the thick film achievable using screen printing not exceeding 50 µm after baking. As a result, it is strongly suggested that the web length be designed at least in the range between 150 mm and 3000 mm. Depending on the measurement precision requirement, further web lengths of 250 mm to 2000 mm and, in an even more closely defined design, 320 mm to 1000 mm, are also to be used according to the present invention.

In order to be able to apply this length to the sensor tongue, it is necessary to position it in a Greek key shape thereon.

The maximum length of the sensor tongue is given by the diameter of the cooktop 3 to be monitored, as is obvious. The sensor tongue is to be understood as the ceramic element 22, carrying the resistor web, which extends into the cooktop. A preferred embodiment provides a sensor tongue length of at most ¾ of the cooktop diameter. Dimensions which extend from a fifth to a half of the cooktop diameter are specified as further lengths preferred according to the present invention.

The web width of the printed resistor webs 23 is to be selected according to the web length and size of the cooktop 3 to be monitored. Typically, a web width between 0.01 and 1 mm is considered advantageous according to the present invention. A further preferred embodiment provides web widths between 0.1 and 0.5 mm, which are preferably produced according to the present invention using screen printing technology. Webs applied using screen printing have sufficient precision in regard to height and width, which is in turn of significance for the desired sensor resistance. In principle, however, any physical coating method, even sputtering, for example, is suitable for applying such electrically conductive webs to a substrate.

An essential feature of the printed and baked resistor web under operating conditions is represented by the more strongly pronounced section (2a) which points toward the electrical contacts. This section, which is applied significantly more thickly, may sufficiently absorb thermomechanical tensions caused by the temperature gradient between the inside and the outside of the cooktop under operating conditions, so that breakage of the printed conductor web is avoided in this region. A further decisive effect thus achieved, which contributes to the precision of the sensor, is the reduction of the electrical resistance in the same supply line region connected thereto, which naturally is a function of the cross-section, among other things. In other words, $R_{supply\_line}$ is thus very much smaller than $R_{resistor\_web}$. The temperature value determined by the temperature-dependent resistance sensor is thus more precise and is not influenced or is only influenced to a negligible degree by any temperature oscillations in the contact region.

The material carrying the resistor web 23 is preferably manufactured from ceramic, and especially preferably from $Al_2O_3$. As shown in FIGS. 3 to 7, the ceramic carrier 22 may have a broadened region in the region of the contact 41, the transition 25 to the remaining narrower region of the ceramic element preferably being rounded concavely. As shown in particular in FIG. 10, the ceramic carrier 22 can be tapered toward a free end thereof which faces away from the contact point. This tapering, which is seen as a concave broadening toward the sensor contact, is thus shown to be responsible for the mechanical stability of the sensor, so that support webs and/or other constructively visible reinforcements may be dispensed with. To conform the course of the resistor web 23 to the profile of the ceramic carrier 22, the resistor web 23 has also a concave portion 23a, as shown in FIG. 5.

Figure 2:
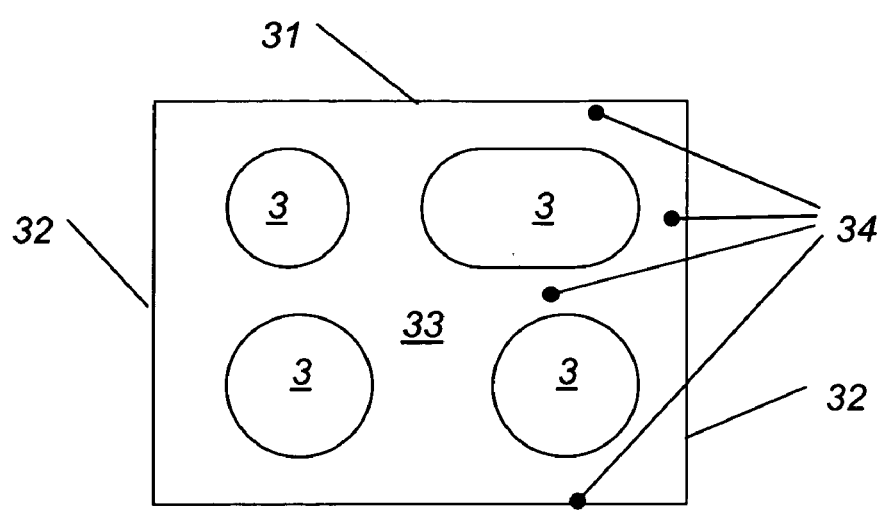
FIG. 2 shows a top view of a ceramic cooktop having heating regions.
Figure 8:
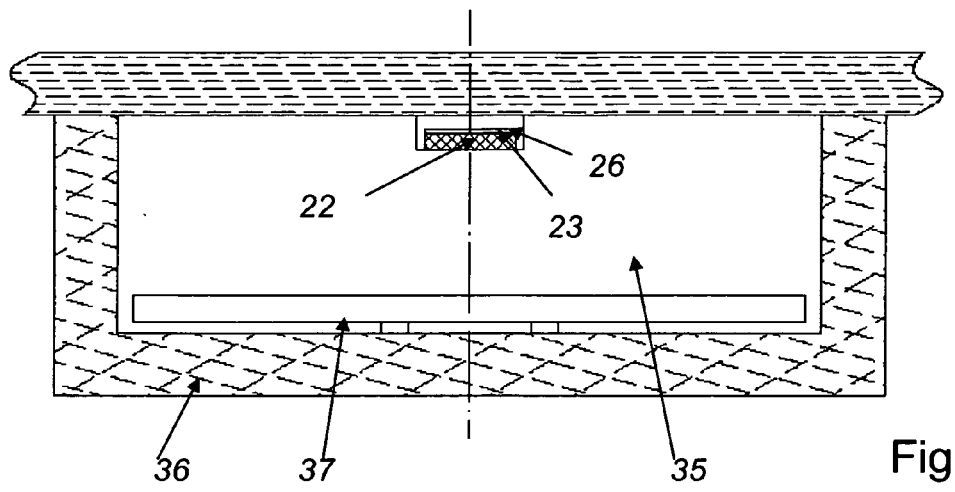
FIG. 8 shows a section through a heating element.
Figure 9:
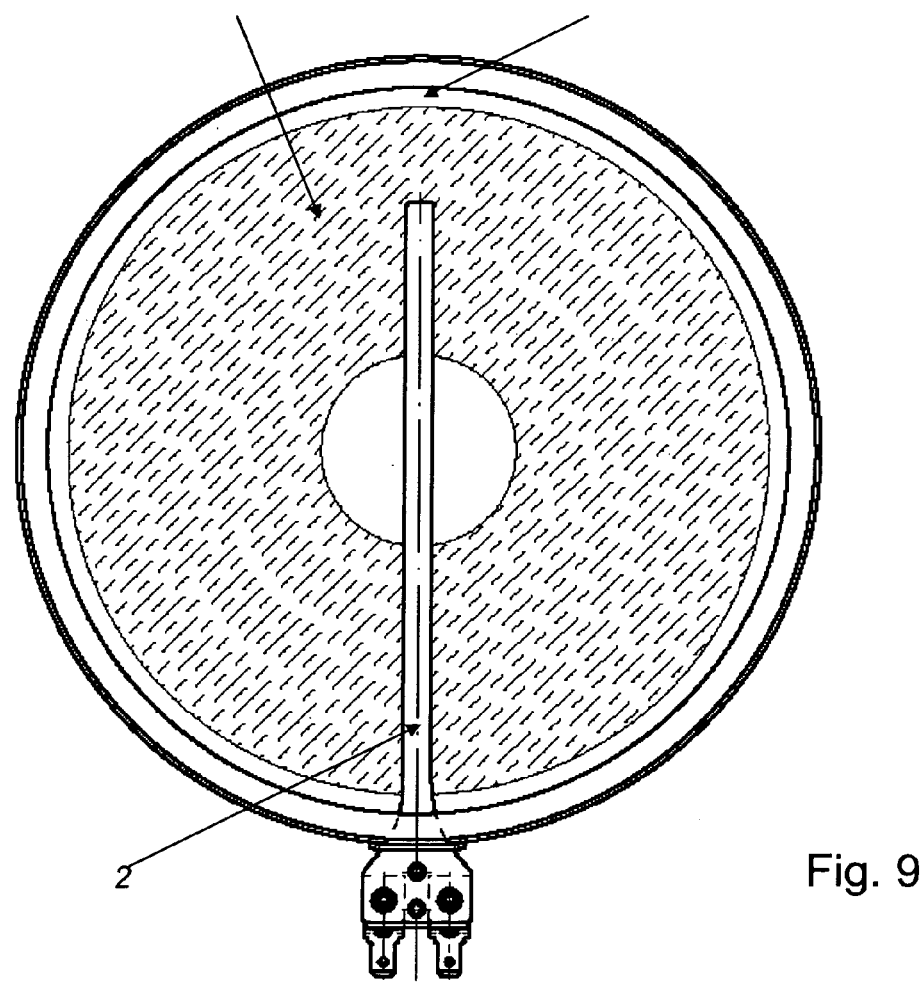
FIG. 9 shows a top view of a heating element.

Depending on the intended sensor size and sensor web length to be applied, the substrate may preferably be implemented as tapered in different ways. FIGS. 1 and 2 show uniform diameters of the sensor tongue after the tapering. FIG. 2 shows sequential tapers of the sensor tongue, which may be positioned sequentially in any arbitrary number.

The shaping according to the present invention may be performed already in the manufacturing process, requiring powder metallurgy, or even at a later point in time, the desired molded parts, which are subsequently subjected to a thermal treatment, able to be cut out of ceramic plates using lasers. This means that the ceramic molded part is supplied to a resintering process. After a precisely defined temperature program, the cut-out molded parts are annealed at temperatures up to 1600° C. and subsequently slowly cooled. This has the result that the ceramic material does not crack and/or does not later deform in an undesired way under thermocyclic conditions, as are provided in a cooktop 3.

This temperature treatment step is preferably combined with the baking of the printed resistor web 23.

In addition, it is preferable according to the present invention to apply a glass or glass ceramic layer over the resistor web 23 to protect and possibly insulate the latter. The application is again performed using screen printing technology. This protective, insulating insulation layer 26 is subsequently fixed on the substrate carrying the resistor web 23 through baking at or just below the melting temperature of the glass or ceramic frit used.

Figure 10:
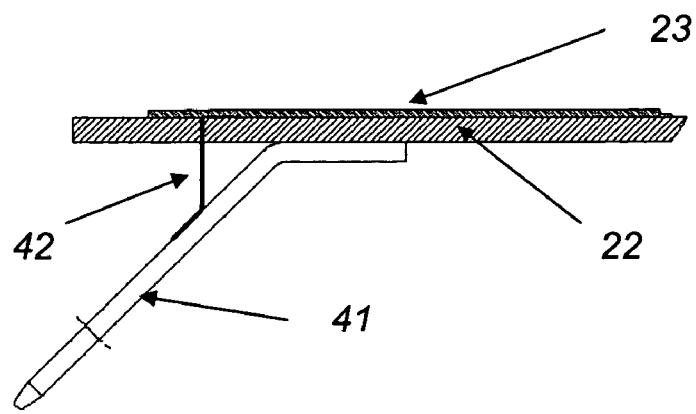
FIGS. 10 and 11 show each a section through contacts of the resistor web.
Figure 11:
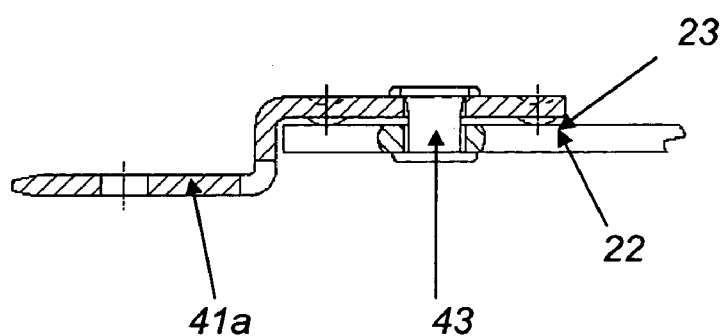

Electrical contact between the contact 41 and the resistor web 23 may be produced via a metal strip 42, which is connected to the resistor web 23 from the contact 41 via a slot in the ceramic element 22 (see FIG. 10).

An elastic contact 41a may also be connected via a rivet 43 to the ceramic element 22, the resistor web 23 being clamped between the elastic contact 41a and the ceramic element 22.

FIG. 2 shows a ceramic cooktop 33 having heating regions 3. The number, shape, and position of the heating regions 3 on a cooktop may be varied arbitrarily in this case. A sensor 2 (not shown in FIG. 2), which is schematically shown in FIG. 1, is assigned to each heating region. The sensors 2 are electrically connected via lines 20 to a computer unit 10. The sensors 2 are initially uncalibrated and may be implemented as resistance sensors, for example.

Furthermore, a standard sensor 1, such as a platinum resistance sensor having known temperature-dependent resistance $R_s(T)$, particularly a PT-100 or PT-1000 sensor is positioned in the region of the computer unit 10. In cooperation with the computer unit 10, the standard sensor 1 provides the particular current temperature value in the region of the computer unit 10.

Further sensors 21 may also be positioned in regions 34 outside the heating regions 3.

The individual sensors are calibrated in this case in such a way that in a first step the temperature of the cooktop, which is in thermal equilibrium, is measured with the aid of the calibrated sensor. In a further step, the resistances of the uncalibrated sensors associated with this temperature are now measured. A calibration factor and/or the resistance of the sensors at a defined temperature, preferably 25° C., may easily be determined from this information and subsequently stored.

The sensors 2 are resistance sensors, particularly platinum resistance sensors, which have a resistance R(T) as a function of the particular temperature T, each having known electrical resistance coefficients. The initially unknown null assistance $R_0$ at a standard temperature $T_0$, particularly room temperature, e.g. 25° C., is implemented as the calibration value, R(T) is determined at the temperature $T_0$ by the computer unit (10), and $R_0$ is calculated according to the formula $R_0=(1+\alpha \cdot \Delta T)/R(T)$, with $\Delta T=T-T_0$, and the value for $R_0$ is stored in the memory unit (11) as the calibration value.

A calibration of the sensor 2 according to the present invention is performed in temperature equilibrium, particularly before the heating regions 3 are first put into operation, i.e., essentially at room temperature, because then the temperature at the sensors 2 is naturally equal to that at the standard sensor 1. Corresponding calibration values for the sensor 2 are advantageously stored in a memory unit 11 of the computer unit 10.

If the sensors 2 are implemented as resistance sensors, their temperature-dependent resistance R(T) behaves in accordance with $$R(T)=R_0 x(1+\alpha x \Delta T * \beta x (\Delta T)^2)$$

or, in simplified form $$R(T)=R_0 x(1+\alpha x \Delta T)$$

with a known electrical resistance coefficient $\alpha$ and/or $\beta$ in each case and initially unknown null resistance $R_0$ at a standard temperature $T_0$, particularly room temperature, e.g., 25° C., with $\Delta T = T - T_0$. To calibrate the sensors 2 and/or the further sensors 21, the determination of $R_0$ as the calibration value is therefore necessary. The method according to the object is performed in temperature equilibrium, preferably before the heating regions 3 are first put into operation, because it may only be assumed in temperature equilibrium that all sensors 2, 21 and the standard sensor 1 have the same temperature.

In order to avoid drift of the sensors 2, 21 and ensure the precision thereof even after a long time, the method for calibrating sensors 2, 21 may be performed even at a later point in time, so that the calibration values are updated and stored in the memory unit 11. This renewed calibration may be triggered manually, or started automatically after a predefined span of time, particularly after a minimum duration necessary for temperature equilibrium after the last time the heating regions 3 were put into operation.

Furthermore, known temperature curves may also be made useful for determining the temperatures in heating regions 3, for example. Thus, for example, there are characteristic temperature curves during the cooling of a heating region 3 after it is turned off. Furthermore, however, the temperature of sensor 2 of a heating region 3 which is not in operation will increase according to a characteristic curve if neighboring heating regions 3 are operation. Further characteristic temperature curves as a function of the operating state of neighboring heating regions 3 may also be registered by further sensors 21 outside heating regions 3. Such characteristic temperature curves as a function of location, operating state of neighboring heating regions 3, and time may be described as families of characteristics and stored in the memory unit 11. If the corresponding thermal transmission properties in a ceramic cooktop 33 and the corresponding families of characteristics are known, the temperature in any arbitrary regions 34, for example, at back wall 31 or side walls 32, may be determined by computer unit 10 at defined intervals from the temperatures at sensors 2, 21.

To elevate the operational reliability for different regions 34 outside the heating regions, but also for heating region 3 itself, a limiting value $T_{max}$ may be predefined, upon reaching which a procedure, such as an alarm, switching procedure, or a regulating procedure is triggered. Thus, for example, it may be ensured that temperatures which are a safety concern may be avoided in specific regions.

For optimum operational reliability of a ceramic cooktop, it is advantageous to know the current temperature at as many points of the ceramic cooktop as possible. The calibration of the individual sensors is performed in this case in such a way that in a first step the temperature in the cooktop, which is in thermal equilibrium, is measured with the aid of the calibrated sensor. In a further step, the resistances of the uncalibrated sensors associated with this temperature are now measured. A calibration factor and/or the resistance of the sensors at a defined temperature, preferably 25° C., may be easily determined from this information and subsequently stored.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A sensor positioned between a heat source and a heating area in parallel relationship to the heating area, such as a glass ceramic hot plate, heated by a heat source for determining a mean value of the temperature of the heating area, said sensor comprising:
   a ceramic element; and
   a temperature-dependent resistor web attached to the ceramic element and confronting the heating area at a distance thereto, said resistor web having a length of at least 200 mm and being electrically contacted at a contact area outside a region in which the temperature is to be ascertained,
      wherein the ceramic element has a sensor tongue extending from the contact area to a free end thereof and defining a length, said sensor tongue constructed to taper continuously along its entire length from the contact point to the free end to improve the mechanical stability.

2. The sensor of claim 1, wherein the resistor web has a first cross section in an area between the contact point and a temperature-sensitive region of the sensor, and a second cross-section in a measurement region, said first cross section being greater than the second cross section.

3. The sensor of claim 2, wherein the first cross section is at least twice the size of the second cross section.

4. The sensor of claim 1, wherein the ceramic element has a broadened region in an area of the contact point, a narrower region, and a rounded transition from the broadened region to the narrower region of the ceramic element.

5. The sensor of claim 4, wherein the transition is shaped concavely.

6. The sensor of claim 1, and further comprising contact parts made of elastically springy material for contacting the resistance web, said contact parts provided with indentations facing toward the resistor web and riveted to the ceramic element.

7. The sensor of claim 1, and further comprising a flat strip material for contacting the resistor web, said flat strip material being at least partially positioned between the ceramic element and the resistor web and connected to the resistor web, with a surface of the sensor representing a flat area.

8. The sensor of claim 1, wherein the resistor web is insulated by a closed passivation layer.

* * * * *